United States Patent [19]
Behrens

[11] Patent Number: 5,192,095
[45] Date of Patent: Mar. 9, 1993

[54] COUPLING DEVICE

[75] Inventor: Gunter Behrens, Schlob-Holte, Fed. Rep. of Germany

[73] Assignee: Parker Ermeto GmbH, Bielefeld, Fed. Rep. of Germany

[21] Appl. No.: 786,446

[22] Filed: Nov. 1, 1991

[30] Foreign Application Priority Data

Nov. 2, 1990 [DE] Fed. Rep. of Germany ........ 4034803

[51] Int. Cl.$^5$ ............................................. F16L 25/00
[52] U.S. Cl. ................................ 285/332.1; 285/334.1
[58] Field of Search ............... 285/334.1, 332.1, 332.2, 285/332.3

[56] References Cited

U.S. PATENT DOCUMENTS

| | | | |
|---|---|---|---|
| 1,298,687 | 4/1919 | Franck | 285/334.1 |
| 2,993,677 | 7/1961 | Ford | 285/332.1 X |
| 3,233,921 | 2/1966 | Holmgren et al. | 285/332.1 X |
| 3,332,709 | 7/1967 | Kowalski | 285/332.1 X |
| 4,252,346 | 2/1981 | Sundholm | 285/334.1 |
| 4,647,084 | 3/1987 | Hagin | 285/334.1 X |
| 4,681,352 | 7/1987 | Sundholm | 285/334.1 |

FOREIGN PATENT DOCUMENTS 19218 of 1910 United Kingdom ............. 285/332.1

Primary Examiner—Dave W. Arola
Attorney, Agent, or Firm—Christopher H. Morgan

[57] ABSTRACT

The invention provides a coupling device for high pressure threaded pipe connection to a coupling body with a standard 24 degree connector, a coupling nut to establish a pressure tight connection and a shaped pipe or a connection stub for connection to other system components. An adapter ring is proposed with a cylindrical internal bore and radially progressing and/or domed end ring faces of different sizes, at least one of which is formed as a sealing face fitted with a ring seal, to each of which an axially directed cylinder outer face is juxtaposed, between which a 24° outer bevel is arranged to adapt to the coupling body. The ring face of the adapter ring which when fitted is directed towards the connection stub or the flared flange of the shaped pipe is provided with an annular groove to accept a ring seal or an o-ring.

8 Claims, 2 Drawing Sheets

COUPLING DEVICE

BACKGROUND OF THE INVENTION

1. Field of the Invention

The invention relates to a coupling device for high pressure-tight threaded pipe connectors with a standard coupling body with a 24 degree connector, a coupling nut, to effect a pressure-tight connection and a standard pipe or a connection stub for connection to other system components.

2. Description of the Prior Art

With the customer threaded pipe connectors, the pipe when fitted is located in the proximity of the bore of the connector or of its inner bevel and is connected to the connector by a cutting ring or compression washer and a coupling nut.

Both during fitting and removal of the coupling, the pipe must be moved so far in an axial direction after releasing the coupling nut, that it can be removed radially. In those cases where the space required for fitting and removing the pipe in an axial direction is not available, the customer pipe couplings can therefore not be employed.

DE-Gbm 1 979 979 describes a threaded pipe connector in which, with the aid of a coupling nut and a compression washer, a pipe forms a butt joint, with a connector provided with a bore, whereby the bore is provided with an inner bevel, a cylinder face and an annular face arranged at right angles to the bore axis. In the bore of the connector a packing ring is arranged which can be clamped to the wall of the bore and which is provided with a radial stop face which when the threaded pipe coupling is fitted, abuts on to the annular stop face of a connecting compression washer.

A threaded pipe coupling of this type embodies certain characteristics which render it unsuitable for specific applications. The device incorporates several deformation points which make it difficult for the fitter to recognize correct seating by registering a sharp increase in the force required when tightening the device. The front face of the packing ring is provided with an annular edge and its outer circumferential face with an annular ridge. Both elements contribute to the clamping process so that both must be deformed during fitting. The adjacent compression washer and the pipe surface on which the compression washer acts are also subject to deformation. Due to the force required for this, which exceeds the tightening force of the packing ring, it is difficult or impossible for the fitter to recognize what stage the tightening process has reached. Furthermore, because of the deformation there are no clearly defined sealing surfaces which can withstand maximum pressures during fitting or refitting.

Finally, the prior device evidences ring shaped grooves and elevations on the inner surface of the flow channel which form resistance to the flow thereby causing eddy currents in the fluid which is unacceptable in certain applications.

SUMMARY OF THE INVENTION

The object of the invention is the provision of a high pressure-tight coupling device which can be fitted and removed radially or nearly radially and axially, which constitutes no or only very small restriction of the internal diameter when compared to the threaded pipe coupling, which guarantees a high degree of reliability when being fitted by providing a recognizable positive location and which ensures a high surface pressure on radial sealing surfaces by the direct transmission of force.

The attainment of this task is provided by the invention inasmuch as an adapter ring is proposed with an internal cylindrical bore and end ring faces of different sizes proceeding radially of which at least one takes the form of a sealing face with a ring seal, to each of which axially arranged outer cylinder surfaces are juxtaposed, between which a 24° outer bevel for adaptation to the coupling body is provided.

A coupling device of this sort permits radial fitting and removal so that the device can be applied in the narrowest of spaces without the need for additional room.

In a variation of the invention, an adapter ring is proposed with an internal cylindrical bore and one end ring face proceeding radially and with one convex or concave dome spherical and ring face, of which at least one takes the form of a sealing face with a ring seal, each of which abuts axially with the cylinder or outer bevel face and through a 24° outer bevel for adaptation to the standard coupling body.

This type of variation of the coupling device permits the connection stub to be fitted in a slightly offset direction, i.e. on a line which deviates from the axis of the connector of the adapter by approximately 5 degrees. By this means a reliable high pressure sealing connection is reached for pipes which are not aligned with the coupling body. Furthermore, standard 24 degree pipe connectors can be used to advantage which, until now, were only reliably functional when used with perfectly aligned connectors and pipes.

In a further development of the two versions of the inventions, the outer bevel of the adapter ring is provided with an annular groove to accept a ring seal, preferably an o-ring. By this means, a fluid-tight seal of the path between coupling body and adapter ring is ensured, in particular at the bevel face of both these bodies even at maximum pressures.

A further decisive guarantee of the fluid-tightness of the system is provided by the invention in that the radial or domed face of the adapter ring which, when fitted, is directed at the connection stub or at the radial or correspondingly domed end part of the shaped pipe, is provided with an annular groove to accept a ring seal, preferably an o-ring.

One version of the invention provides the shaped pipe with a flared pipe end arranged at approximately 90° to the axis of the pipe, the so formed flared flange of which, when fitted, forms a sealing face with the radial face of the adapter ring which is provided with a sealing element.

For this version of the pipe device, it is essential when fitting to arrange a ferrule between the coupling nut and the shaped pipe. Its stop face directed to the outer face is preferably smaller than the sealing face between the inner face of the flared flange and the adapter ring. This ensures that, when fitting or removing the coupling, i.e. when rotating the coupling nut, no torque is transmitted to the shaped pipe, but is absorbed by the ferrule.

In order to achieve this effect when using a connection stub, the stop face of the coupling nut engaging the connection stub is smaller than the sealing face between the connection stub and the adapter ring.

DESCRIPTION OF PREFERRED EMBODIMENTS

Figure 1:
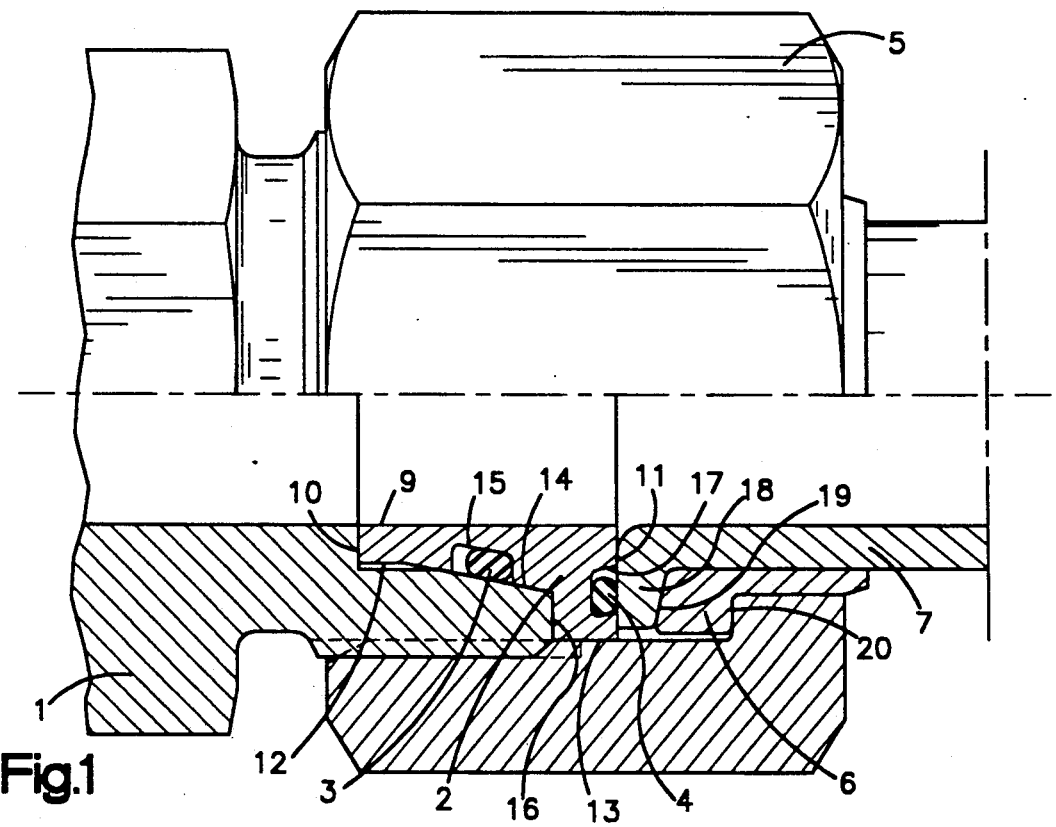
FIG. 1 is a fragmentary axial sectional view through the coupling device using a flared pipe.

FIG. 1 shows a fragmentary axial sectional view and a fragmentary sectional view through a coupling device comprising a coupling body 1, provided with a standard 24° inner bevel, a coupling nut 5, the inner helical thread of which engages the outer helical thread of the coupling body 1, a shaped pipe 7 provided with a flared flange 18, arranged at approximately 90° to the longitudinal axis of the pipe and a ferrule 6 arranged between the coupling nut 5 and the shaped pipe 7 and which is pressed against the flared flange when the coupling nut 5 is rotated. The adapter ring 2 is provided with a bore 9 which forms part of the flow channel and which is limited by the radial end or ring faces 10 and 11. The outer radii of both ring faces 10 and 11 are of different sizes, whereby the outer radius of the ring face 10 is equal to or slightly less than the outer radius of the stop ring face limiting the inner bevel of the coupling body. The adapter ring 2 is provided with a 24° outer bevel 14 for adaptation to the inner bevel of the coupling body whereby an annular groove 15 is provided in the bevel face to accept a ring seal or o-ring. For adaptation to the standard coupling body 1, the adapter ring is provided with a cylinder outer face 12 and a radially progressing ring face 16 between its bevel face 14 and its ring face 10.

The end face or ring face 11 of the adapter ring 2 is similarly provided with an annular groove 17 to accept a ring seal or o-ring 4. The inner radius of the ring face 11 corresponds to the inner radius of the coupling body 1. This results in the exact adaptation of the adapter ring 2 to the standard coupling body 1 thus forming a continuous transition between the inner bore of the coupling body 1 and the adapter ring 2, thus avoiding any disturbance of the flow or pressure conditions in the pipe system. The outer radius of the ring face 11 is slightly smaller than the inner radius of the coupling nut 5.

In this example of the invention, the torque originating with the coupling nut when fitting or removing the coupling device, is advantageously absorbed by the ferrule 6 because its radial and stop faces 19 and 20, both with regard to their relative size or, when applicable, with regard to their surface structure, are formed in such a manner as to prevent the resultant torque being transmitted to the shaped pipe.

An essential advantage of the present invention is the fact that a standard threaded stub with bevelled seat can be used whereby the fitting and removal can be performed axially and radially. In contrast to the threaded pipe connectors there is no restriction of the internal diameter and, as no deformation forces are required, a high degree of reliability is achieved by the existence of a definite point of location. On the radial sealing system, a high surface pressure is made attainable by means of the direct transfer of force from the coupling nut, through the ferrule and the flared flange, to the adapter ring enabling this coupling device to be used on applications with pressures in excess of 600 bar.

Figure 2:
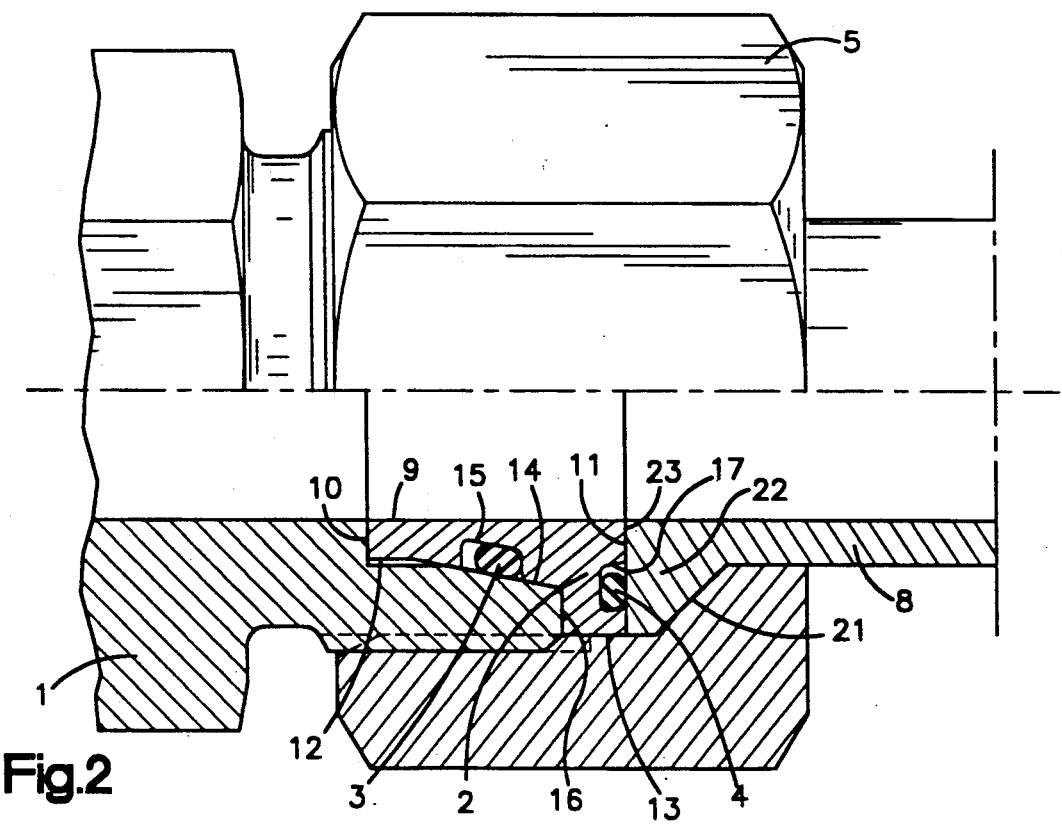
FIG. 2 is a fragmentary axial sectional view through the coupling device using a connection stub.

FIG. 2 shows a fragmentary axial sectional view through the coupling device using a connection stub. The coupling device comprises an arrangement similar to that depicted in FIG. 1, namely a coupling body 1 provided with a standard 24° inner bevel, in this case a standard coupling nut 5, the internal helical thread of which engages with the external helical thread of the coupling body 1, a connection stub 8 with a connecting flange 20 with its bearing face 23. The adapter ring 2 corresponds to the version depicted in FIG. 1. It is provided with a bore 9 which forms part of the flow channel and which is limited by the radial end or ring faces 10 and 11. The outer radii of both ring faces 10 and 11 are of different sizes, whereby the outer radius of the ring face 10 is equal to or slightly less than the outer radius of the stop ring face limiting the inner bevel of the coupling body. The adapter ring 2 is provided with a 24° outer bevel 14 for adaptation to the inner bevel of the coupling body whereby an annular groove 15 is provided in the bevel face to accept a ring seal or o-ring. For adaptation to the standard coupling body 1, the adapter ring is provided with a cylinder outer face 12 and a radially progressing ring face 16 between its bevel face 14 and its ring face 10.

The pipe coupling device depicted in FIG. 2 embodies the same advantages as the pipe coupling device depicted in FIG. 1, the only difference being that the ferrule is not provided and the connection stub is used instead of the flared pipe. Here again a high face pressure on the radial sealing system is attainable by means of the direct transmission of the force exerted on the coupling nut through the flange 22 of the connection stub 8 to the adapter ring 2, enabling the coupling device to be used on applications with pressures in excess of 600 bar.

Figure 3:
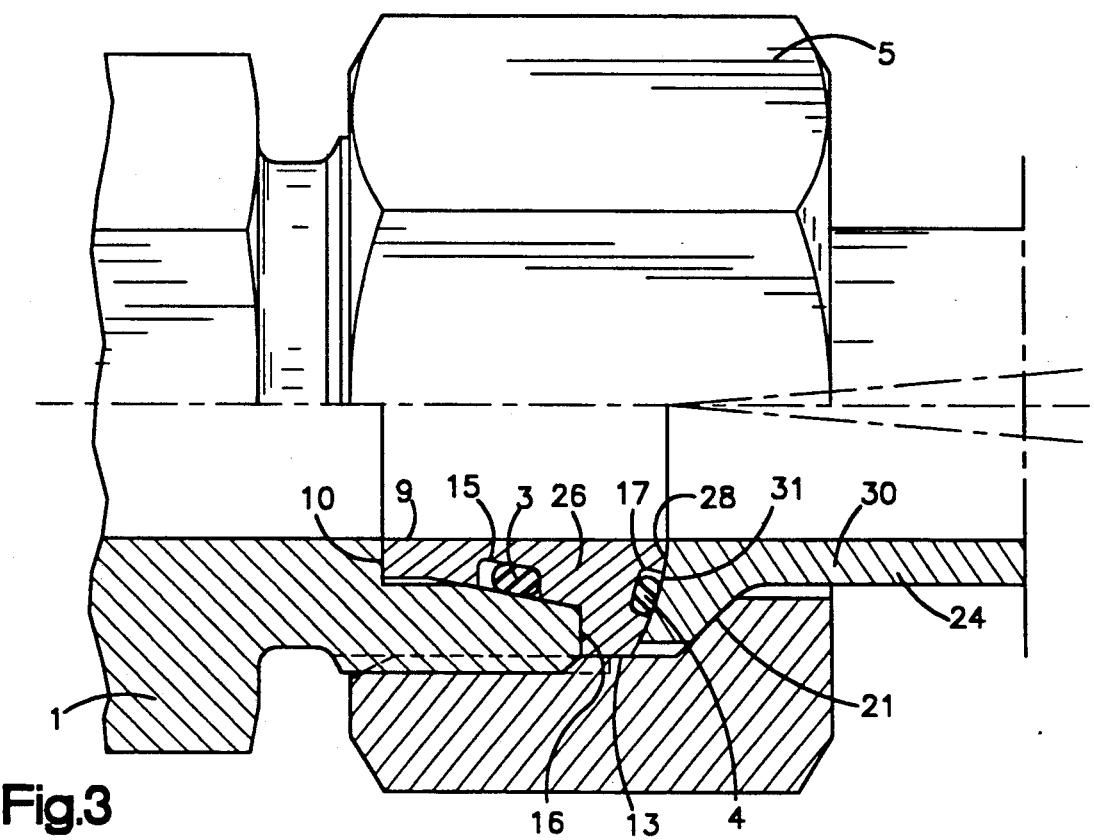
FIG. 3 is a fragmentary axial sectional view through the coupling device using a connection stub with a concave domed stop face.

FIG. 3 depicts a variation of the invention in the form of a fragmentary axial sectional view through the coupling device using an adapter ring with a convex shaped sealing face and connection stub with a correspondingly concave shaped bearing surface.

Apart from the provision of the spherically shaped sealing faces, the version is similar in construction to the version depicted in FIG. 2. The coupling device comprises in similar manner a coupling body 1 with a standard 24° inner bevel, in this version a standard coupling nut 5 the internal helical thread of which engages the out helical thread of the coupling body 1, a connection stub 24 with a connecting flange 30 with its concave bearing face 31. The adapter ring 26 corresponds in design to that depicted in FIGS. 1 and 2 except that it is provided with a convex sealing face 28. It is provided with a bore 9 which forms part of the flow channel and which is limited by the radial end face 10 and the convex sealing face 28. The outer radii of the two faces 10 and 28 are of different sizes whereby the outer radius of the ring face 10 is equal to or slightly smaller than the outer radius of the stop ring face which limits the inner bevel of the coupling body 1.

The adapter ring 26 is provided with the 24° outer bevel for adaptation to the inner bevel of the coupling body 1, whereby an annular groove is also provided in the bevel face to accept a ring seal or o-ring. Between its bevel face 14 and its ring face 10, the adapter ring 26 is provided with a cylinder outer face 12 and a radially progressing ring face 16 for adaptation to the standard coupling body 1.

Figure 4:
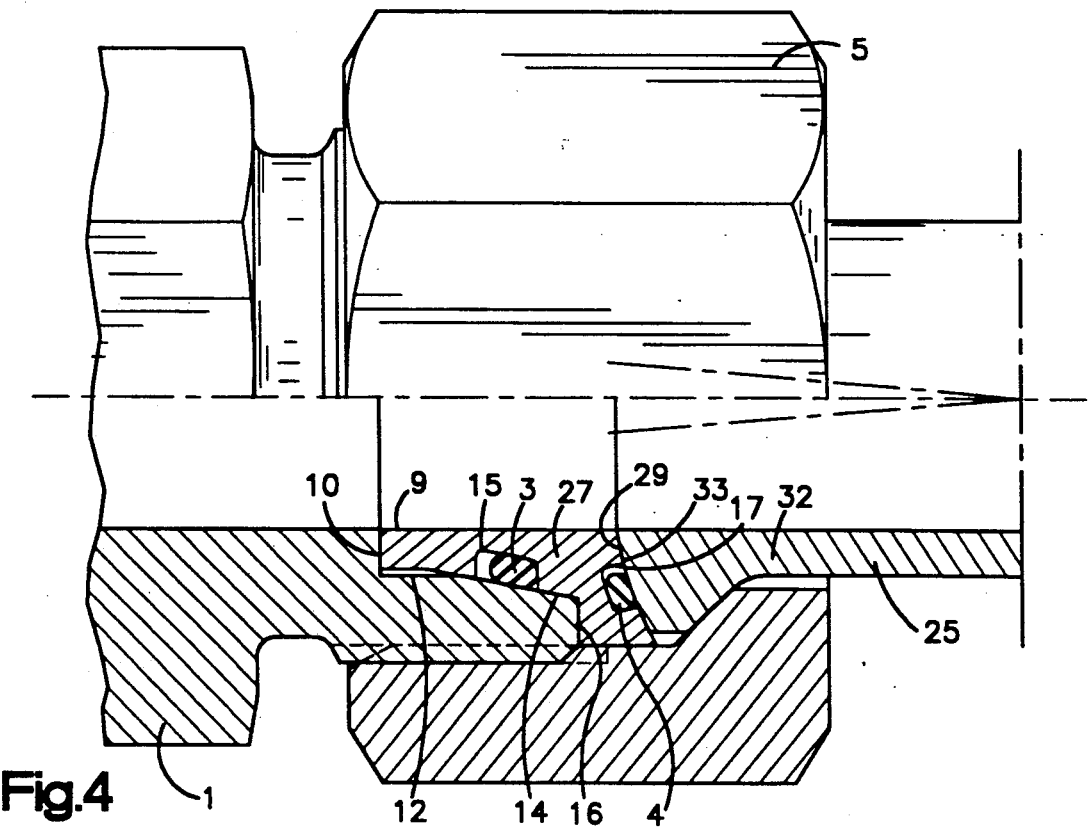
FIG. 4 is a fragmentary axial sectional view through the coupling device using a connection stub and a convex domed stop face.

FIG. 4 depicts a variation of the invention depicted in FIG. 3, in which the domed sealing surfaces of the adapter and the connection stub are interchanged. All other characteristics correspond to the version depicted in FIG. 3.

The coupling device comprises in similar manner a coupling body 1 with a standard 24° inner bevel, in this version a standard coupling nut 5 the internal helical thread of which engages the outer helical thread of the coupling body 1, a connection stub 25 with a connection flange 32 with its convex bearing face 33. The adapter ring 27 corresponds in design to that depicted in FIGS. 1, 2 and 3 except that is provided with a concave sealing face 29. It is provided with a bore 9 which forms part of the flow channel and which is limited by the radial and face 10 and the concave sealing face 29. The outer radii of the two faces 10 and 29 are of different sizes whereby the outer radius of the ring face 10 is equal to or slightly smaller than the outer radius of the stop ring face which limits the inner bevel of the coupling body 1.

The adapter ring 27 is provided with the 24° outer bevel for adaptation to the inner bevel of the coupling body 1, whereby an annular groove 15 is also provided in the bevel face to accept a ring seal or o-ring. Between its bevel face 14 and its ring face 10, the adapter ring 27 is provided with a cylinder outer face 12 and a radially progressing ring face 16 for adaptation to the standard coupling body 1.

The coupling devices depicted in FIGS. 3 and 4 permit the connection stub to be fitted in a slightly offset direction, i.e. on a line which deviates from the axis of the connector of the adapter by approximately 5 degrees, whereby a reliable high pressure sealing connection is attained for pipes which are not aligned with the coupling body. It is of particular advantage that the invention enables standard 24 degree pipe connectors to be used which, until now, were only reliably functional when used with perfectly aligned connectors and pipes.

What is claimed is:

1. A coupling device, comprising:
   a coupling body of the type having an outer thread, an internal bore and an inner bevel;
   a pipe with an outwardly flared flange;
   a nut with an inner thread which mates with the outer thread of the coupling body for threaded connection thereto and an inner flange which is captured by the outwardly flared flange of the pipe; and
   an adapter piece which is received in said coupling body so that said nut can be extended over said adapter piece to threadedly join said coupling body with said pipe with said adapter piece pressed therebetween by the tightening of the nut, said adapter piece having an outer bevel which mates with the inner bevel of the coupling body, and radially arranged end ring faces of different dimensions disposed at opposite axial ends of said adapter piece at least one of which forms a sealing face with a sealing ring disposed for mating with and sealing against said outwardly flared flange of said pipe.

2. The coupling device of claim 1 which further comprises an annular groove formed in said outer bevel of said adapter piece and a sealing ring disposed therein to seal between said adapter piece and said inner bevel of said coupling body.

3. The coupling device of claim 2 which further comprises an annular groove disposed in said sealing face of said adapter piece and in which said sealing ring is disposed for mating with and sealing against said outwardly said flange of said pipe.

4. The coupling device of claim 1 wherein said flared flange of said coupling body is arranged at about 90 degrees to the pipe axis.

5. The coupling device of claim 1 wherein a ferrule having an outwardly flared flange which mates with the outwardly flared flange of said pipe extends between said nut and said pipe.

6. The coupling device of claim 1 wherein said inner flange of said nut and said outwardly flared flange of said pipe meet at an inner face surface which is smaller than the sealing inner face between the sealing face of the adapter piece and the outwardly flared flange of the pipe so that tightening of the nut does not rotate the adapter piece.

7. The coupling device of claim 1 wherein said sealing face of said adapter piece and the portion of the outwardly flared flange of the pipe against which the sealing face bears have mating spherical section shapes to allow off-axis connection of the said pipe to said coupling body.

8. A coupling device, comprising:
   a coupling body of the type having an outer thread, an internal bore and an inner bevel;
   a pipe with an outwardly flared flange having a face portion of which has a spherical section shape;
   a nut with an inner thread which mates with the outer thread of the coupling body for threaded connection thereto and an inner flange which is captured by the outwardly flared flange of the pipe; and
   an adapter piece which is received in said coupling body so that said nut can be extended over said adapter piece to threadedly join said coupling body with said pipe with said adapter piece pressed therebetween by the tightening of the nut, said adapter piece having an outer bevel which mates with the inner bevel of the coupling body, and radially arranged end ring faces of different dimensions disposed at opposite axial ends of said adapter piece at least one of which forms a sealing face with a sealing ring disposed for mating with and sealing against said outwardly flared flange of said pipe, said sealing face having a spherical section shape which mates with the special section shape of said face portion of said pipe so that said pipe can be connected to said coupling body in an off-axis configuration.

* * * * *